Patented Sept. 24, 1935

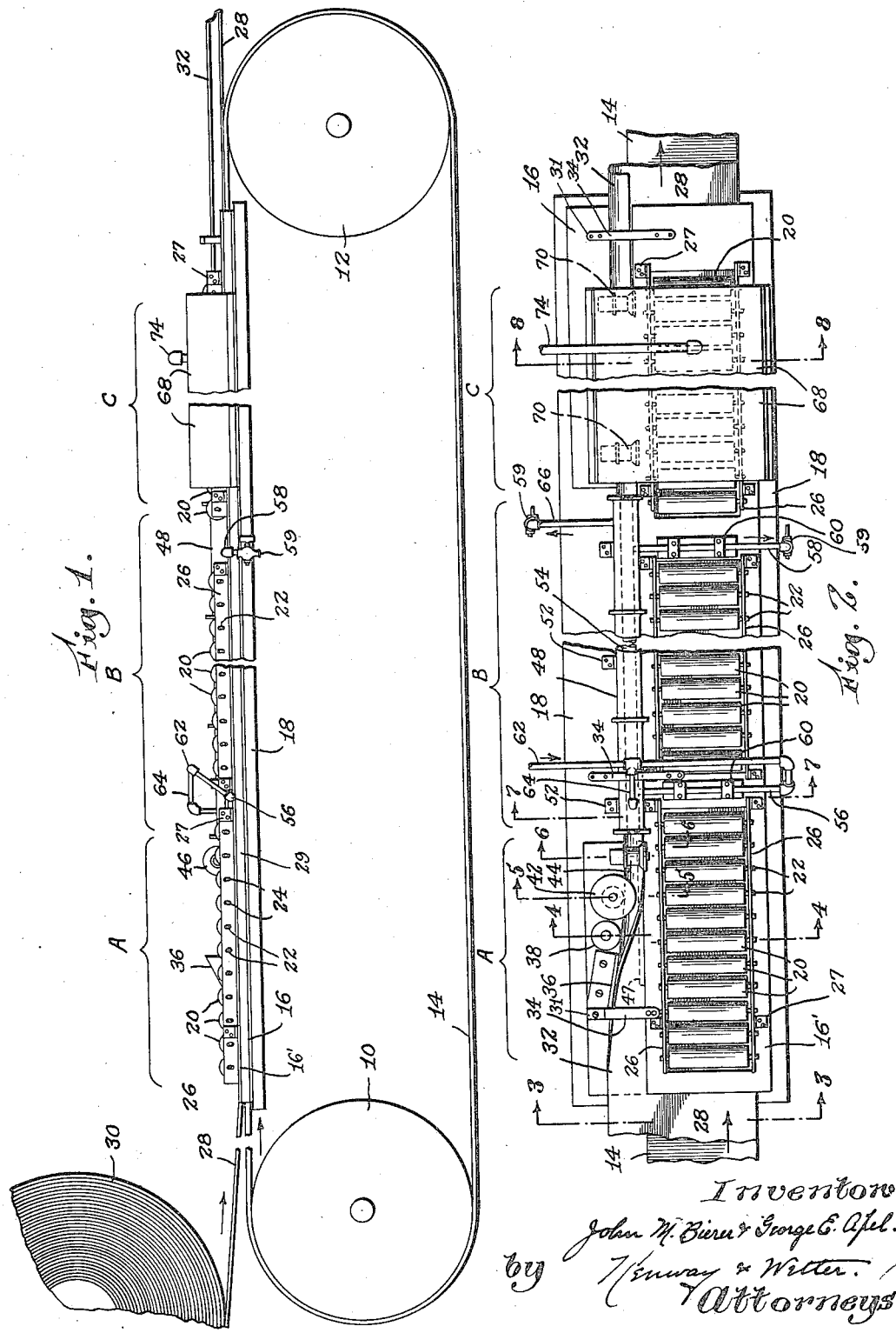

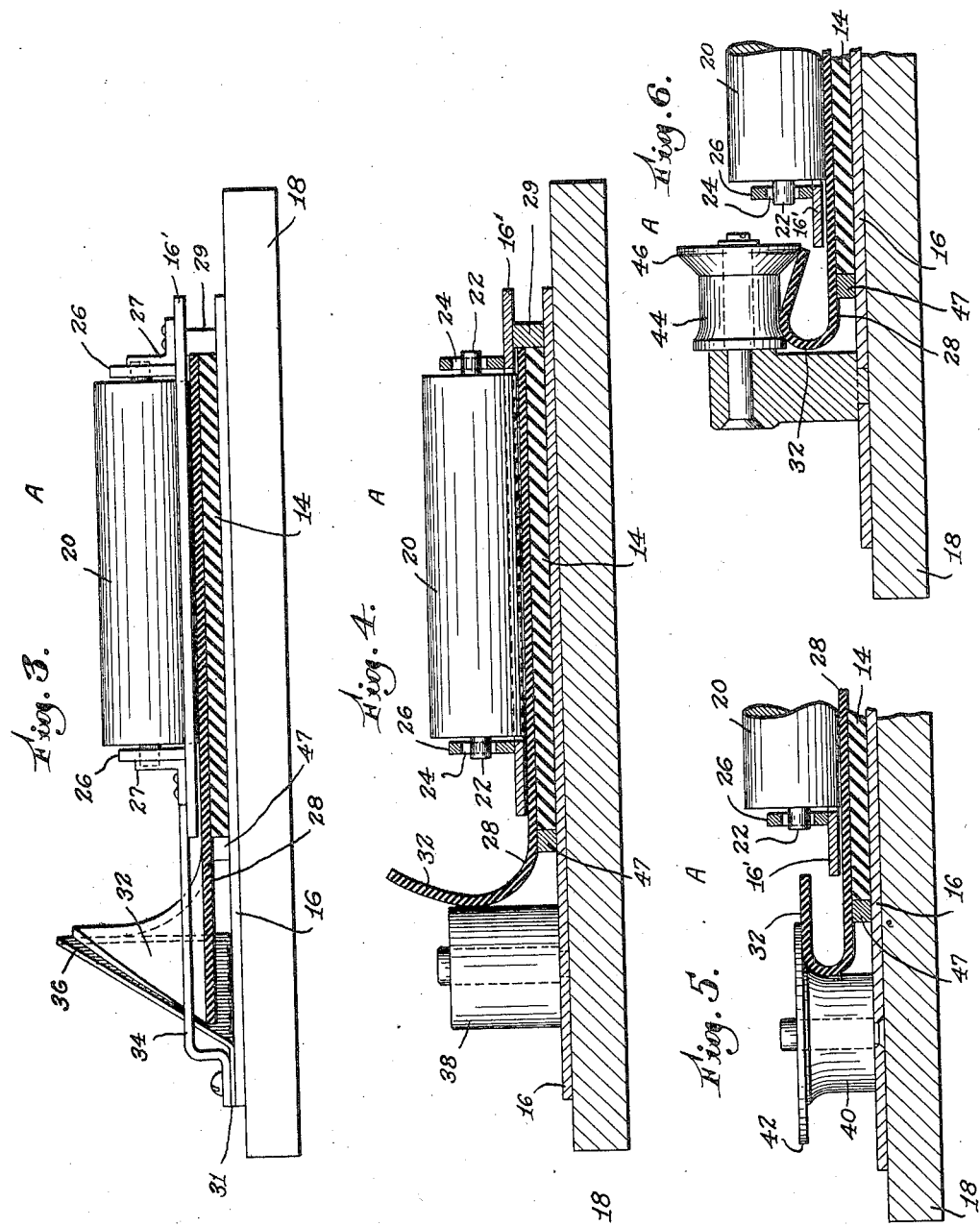

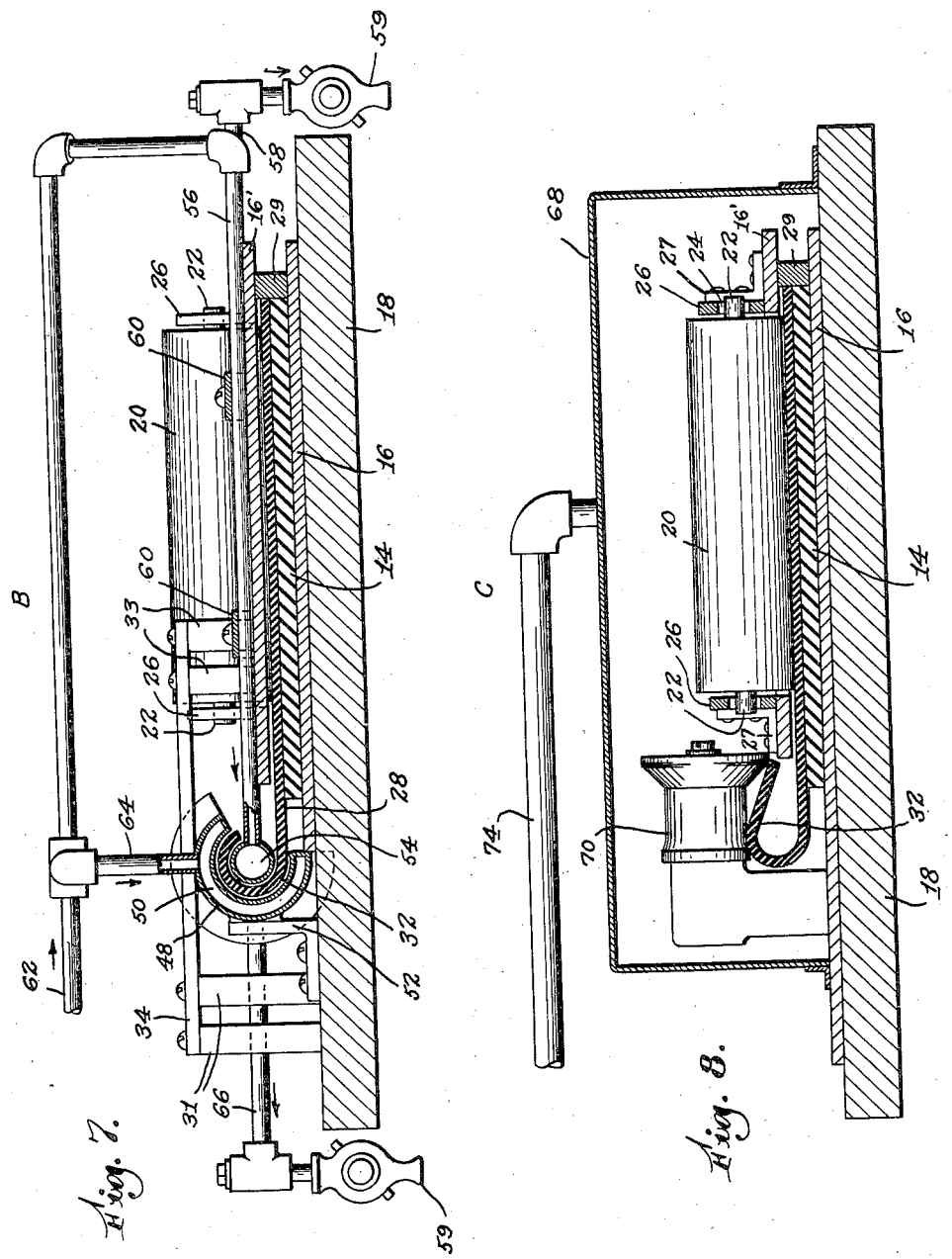

2,015,445

UNITED STATES PATENT OFFICE 2,015,445

PROCESS OF AND APPARATUS FOR SHAPING SHEET RUBBER OR THE LIKE

John M. Bierer, Newton, and George E. Apel, Belmont, Mass., assignors to Boston Woven Hose and Rubber Company, Cambridge, Mass., a corporation of Massachusetts Application December 18, 1934, Serial No. 758,052

19 Claims. (Cl. 18—4)

This invention relates to a process of and apparatus for shaping sheet rubber or the like. More specifically, the invention consists in a novel method and apparatus for continuously forming or molding a permanent curve or bend in the edge portion of a plastic strip such, for example, as a strip which is to be cut into independent stair tread mats of predetermined sizes, as disclosed in the copending application of John M. Bierer Serial No. 5,722.

In the manufacture of stair tread mats as heretofore practiced, the edge portion of each mat has been inserted in an individual mold or templet imparting the desired curvature thereto, and then hung upon a heated mandrel for an interval of time sufficient to impart to it the desired shape. This practice necessitates the separate handling and treatment of each mat, an extensive equipment of individual molds, and gives no assurance of uniform treatment because the length of time the mats remain on the mandrel depends upon their proper presentation and removal by an operator or a number of different operators. The primary object of the present invention is to make available a continuous process for treating stair tread material or other plastic rubber compound in strip form and to provide suitable apparatus operating automatically to carry the method into effect. The method of my invention is characterized by bending, substantially to the desired shape, the edge portion of the sheet to be permanently curved and then moving said portion through a passage confining said portion to the desired size and shape, and simultaneously therewith applying heat to said portion whereby permanently setting the same to such shape. The bending instrumentalities include a heated mandrel and means for advancing a continuous strip of material with its edge portion curved about the mandrel. This treatment necessarily involves a retarding effect upon the edge portion of the strip, and to balance this and insure uniform and straight line travel of the strip it is proposed to employ retarding means acting upon the body of the strip out of line with its curved edge. Such retarding means may, if desired, take the form of a series of rolls which not only act to retard the strip but assist in maintaining it in a flat condition and also cooperate with the feeding means in bringing about a uniform and accurate feeding movement of the strip while its edge portion is under treatment.

In the novel apparatus of this invention is employed conveyor mechanism for engaging the body portion of the strip over an extended area and pulling the strip along longitudinally, while at the same time holding it firmly in proper position with its edge portion engaged and treated by the mechanism for progressively performing the said curving operation thereon. Thus the invention contemplates the continuous feeding of the product longitudinally and progressively and simultaneously therewith bending its edge portion to the desired curvature, and so treating such portion as permanently to set the same to said curvature.

These and other features of the invention will be best understood and appreciated from the following description of a preferred embodiment thereof, selected for purposes of illustration and shown in the accompanying drawings, in which Fig. 1 is a side elevation of an apparatus embodying my invention;

Fig. 2 is a plan view thereof;

Figs. 3, 4, 5 and 6 are sectional views taken respectively on lines 3—3, 4—4, 5—5 and 6—6 of Fig. 2 and showing progressively the bending of an edge portion of the strip to U-shape.

Fig. 7 is a sectional view taken on line 7—7 of Fig. 2 and showing the setting of the U-shaped edge portion to the desired shape by heat treatment thereof;

Fig. 8 is a sectional view taken on line 8—8 of Fig. 2 and showing the cooling of the treated edge portion while confining it to the desired shape.

Referring now to the specific mechanism disclosed in the drawings as one satisfactory embodiment of the invention, 10 and 12 indicate two rotary drums over which passes and between which is suspended an endless conveyor belt 14 of rubber, fabric or like frictional material. The top reach of the belt passes over and is supported on a metal bed plate 16, which serves also to support the frame posts carrying various treating mechanism, hereinafter described, the bed plate being supported on a suitable table or base 18. Cooperating with the top face of the conveyor belt 14 is a series of rollers 20 having end pintles 22 engaged within vertically extending slots 24 within vertical plates 26 mounted on a plate 16', the interior of the plate 16' being cut out to receive the rollers 20 and the plates 26 being supported in vertical position by braces 27. The plate 16' is supported along one edge on a rail 29 resting on the plate 16, the rail also acting as a guide for one edge of the belt 14. The opposite edge of the plate 16' is supported by three or more plates 34 resting on and secured to the plate 16 at 31 and to the plate 16' at 33 and bridging over the mechanism for treating the edge 32 of the strip 28. The rollers normally ride by their own weight on the belt and the slots 24 permit free vertical movement of the rollers whereby to accommodate sheets of varying thickness passing between the rollers and belt.

The material to be treated is preferably in the form of a continuous strip 28, a supply of which is coiled at 30. The strip is somewhat wider than the belt 14 and is so fed to the machine that the edge 32 to be treated projects beyond the belt, the treating mechanism being disposed along this edge at A, B and C, as shown in Fig. 2. The purpose of this mechanism is permanently to curve the edge 32 to a predetermined size and shape and the mechanism at A serves the purpose of preliminarily bending over the edge 32 substantially to this size and shape. The mechanism at B embodies a passage for receiving and confining the bent edge to the desired size and shape and for setting the same to such size and shape by the application of heat thereto as the strip portion 32 is pulled through the passage. The mechanism at C serves to cool the treated edge while holding it to shape as it leaves the said passage. It will be understood that the strip is fed continuously and that the treating operations are performed continuously as the strip is moved along.

The mechanism at A embodies first a bridge plate 34 beneath which the edge 32 of the strip passes. After passing this plate, the edge of the strip contacts the vertical and angular portion 36 of a deflector secured to the bed plate 16 in the path of movement of said edge. This deflector serves to lift the edge substantially to a vertical position, as shown in Fig. 3, and a roller 38 following the deflector serves further to lift the edge and bend it over slightly, as shown in Fig. 4. Following the roller 38 is a roller 40 having a flanged end 42. This roller receives the portion 32 from the roller 38 and bends it substantially to U-shape, as shown in Fig. 5, and a roller 44 following the roller 40 receives the U-shaped edge and has an enlarged outer end 46 which further bends the edge to the shape shown in Fig. 6. A relatively short rail 47 may be provided on this portion of the plate 16 for aiding in guiding the belt 14. This last shape is substantially that which it is desired permanently to place in the strip, and the shaped edge now passes to the mechanism B, wherein a permanent set is given thereto.

The mechanism B embodies a substantially tubular member or jacket 48 open along the side adjacent to the conveyor 14 and chambered at 50 for the reception of steam, the jacket being supported by brackets 52. Within the tubular member is a hollow mandrel 54 supported by inlet and outlet pipes 56 and 58 integral therewith and secured to the bed plate 16 by clamps 60. Steam is supplied to the jacket 48 and to the mandrel by a supply pipe 62 and pipes 64 and 56. Steam outlet pipes are provided from the jacket and mandrel at 66 and 58 and the exit of steam therethrough may be controlled by valves 59. The jacket preferably is constructed in sections and can, therefore, be conveniently made into any length desired.

The jacket 48 and mandrel 54 cooperate to provide a passage therebetween of the size and shape to which it is desired to form the edge portion 32 of the product and the opposing faces of the jacket and mandrel are heated by steam from the supply pipe 62, it being understood that these faces can be heated in and by any other suitable manner and means, such, for example, as by electricity. From the roller 44 the curved edge 32 of the strip passes into the jacket and is automatically shaped around the mandrel, and as the strip is carried along by the conveyor belt this portion is so heated as to take on a permanent set. The steam pressures and temperatures may be so regulated as to impart the desired permanent set to the product and since this set is a function of time exposure to heat, the curving machine length can be such as to allow for the desired time to heat exposure. It will be understood that the body portion of the strip is, by means of the rollers 20, held so engaged with a considerable area of the conveyor belt as both to convey the strip along and hold it in proper alignment throughout its travel. It is also pointed out that the rollers furthermore provide a drag against movement of the strip, acting counter to the drag of the treating mechanism on the edge 32 being treated. It will be apparent that this latter drag tends to twist or swing the strip to the left (Fig. 2) and that the drag produced by the rollers serves to neutralize such tendency and thereby keep the strip in proper alignment as it passes through the machine.

In order to preserve the permanent set in the vulcanized rubber article which has been curved or shaped at an elevated temperature, it is desirable to cool the article while retaining the full contour desired. Such a cooling of the product is provided for herein by mechanism indicated at C. This mechanism includes a housing 68 into which the strip passes as it leaves the jacket 48. In alignment with the jacket within the housing is a pair of rollers 70 having enlarged ends 72 for engaging and holding the edge 32 in its set position as it passes through the housing. Cooling air is provided to the housing by means of a pipe 74 and this air may be directed against the portion 32 of the product by suitable baffles. The length of the cooling section C is such as sufficiently to cool the treated portion of the strip down to the desired temperature.

It will now be apparent that we have produced a novel method and apparatus for treating a strip continuously whereby to impart a permanent curvature to one edge portion thereof. The strip may be fed from a supply roll 30 to and into the bite between the conveyor belt and the pressure rollers 20. When the strip emerges from the machine the edge portion 32 has been formed and permanently set to the desired curvature and the strip may then be cut up into stair treads or mats of the desired sizes, as, for example, in the manner described in the copending application above identified.

Having thus described our invention, what we claim as new and desire to secure by Letters Patent is:

1. A method of shaping sheet rubber or the like, consisting of bending an edge portion of the sheet, pulling it through a passage confining said portion to the desired size and shape, and permanently setting it to said size and shape by the application of heat thereto as it is pulled through said passage.

2. A method of shaping sheet rubber or the like, consisting of bending an edge portion of the sheet to the desired size and shape and pulling it through a passage maintaining it in such shape while holding the sheet in proper alignment by gripping the body portion thereof during its said passage, and permanently setting said portion in shape by the application of heat thereto as it is pulled through said passage.

3. A method of forming a curve of predetermined size and shape in the edge portion of strip rubber or the like, consisting of bending the edge portion substantially to the desired shape, pulling it through a passage maintaining it in such shape, applying heat thereto as it is pulled through said passage, and thereafter applying a cooling medium thereto while holding it substantially to said shape, whereby preserving the shape which has been imparted to it while heated.

4. A continuous method of shaping strip rubber or the like, consisting of advancing the strip longitudinally along a predetermined path, progressively bending an edge portion thereof substantially to the desired curvature at the entering portion of said path, confining said bent portion to the desired shape during its passage through a succeeding portion of the path, and permanently setting that portion in shape by the application of heat thereto during its passage through said confined portion of the path.

5. A method of shaping strip rubber or the like, consisting of advancing the strip longitudinally along a predetermined path, progressively bending one longitudinal edge substantially to the desired curvature at the entering portion of said path, confining said bent portion to the desired shape during its passage through a succeeding portion of the path, holding the strip in proper alignment by gripping the body portion thereof during its passage along the path, and permanently setting the edge portion to said shape by the application of heat thereto during its passage through said confined portion of the path.

6. A continuous method of molding a curve of predetermined size and shape in the edge portion of strip rubber or the like, consisting of pulling the strip longitudinally along a predetermined path, progressively bending the edge portion thereof substantially to the desired size and shape at the entering end of said path, confining said bent portion to shape during its passage through a succeeding portion of the path, applying heat to one or both faces of the strip during its passage through said confined portion of the path, and thereafter applying a cooling medium thereto while holding it substantially to shape.

7. An apparatus for shaping sheet rubber or the like, comprising a tubular shaping member open along one side thereof, a mandrel disposed within said member and spaced from the inner wall thereof, means extending through said open side of the member for supporting the mandrel, means for heating the shaping member and mandrel, and movable means extending along said open side of the member for gripping and pulling a sheet therealong with a portion of the sheet extending about the mandrel within the member.

8. A method of molding a curved edge in a flat plastic strip, which consists in continuously advancing the strip to edge molding instrumentalities, and simultaneously retarding the progress of the body of the strip out of line with the edge portion being molded.

9. An apparatus for shaping sheet rubber or the like, comprising a tubular shaping member open along one side thereof, a mandrel disposed within the member and spaced from the inner wall thereof, means extending through said open side of the member for supporting the mandrel, movable means extending along said open side of the member for gripping and pulling a sheet therealong with a portion of the sheet extending about the mandrel within the member, and means for applying heat to that portion of the sheet within the member.

10. An apparatus for shaping sheet rubber or the like, comprising a tubular shaping member open along one side thereof, a mandrel disposed within the member and spaced from the inner wall thereof, means extending through said open side of the member for supporting the mandrel, means for heating the opposed walls of the shaping member and mandrel, and means including a traveling conveyor extending along said open side of the member for engaging the body portion of the sheet over a relatively large area thereof and pulling the sheet along the member with a portion thereof extending about the mandrel within the member while at the same time holding the sheet in proper alignment.

11. An apparatus for shaping sheet rubber or the like, comprising feeding means adapted to convey a sheet along a predetermined path, means at the entering end of the path for engaging and progressively bending an edge portion of the sheet substantially to a predetermined size and shape as the sheet is conveyed therealong, means at a succeeding portion of the path for further shaping and holding said edge portion to the desired configuration as it travels therealong, and means for applying heat to said edge portion while in the last-named position whereby to give permanent set thereto.

12. The apparatus defined in claim 11, wherein the feeding means comprises a traveling belt for supporting a relatively large area of the sheet, and means for engaging the other side of the sheet and holding it in firm contact with the belt.

13. The apparatus defined in claim 11, wherein the bending means comprises an abutment having a face disposed angularly to and extending toward the feeding means in the direction of movement thereof whereby to engage an edge portion of the sheet and progressively curl the same upwardly, and an overhanging flange located at a succeeding portion of the path for engaging the sheet and further bending the same substantially into U-shape.

14. The apparatus defined in claim 11, wherein the bending means embodies an abutment having a face angularly disposed to and extending toward the feeding means in the direction of movement thereof whereby to engage an edge portion of the sheet and progressively curl the same upwardly, and a plurality of rollers at a succeeding portion of the path and shaped to engage and further bend said edge portion to a predetermined U-shape.

15. The apparatus defined in claim 11 having shaping means comprising a tubular member and a cooperating mandrel therein for engaging said portion of the sheet therebetween.

16. The apparatus defined in claim 11 having shaping means comprising a tubular member and a cooperating mandrel therein for engaging said portion of the sheet therebetween and wherein means is provided for applying heat to certain of the opposed walls of the member and mandrel.

17. The apparatus defined in claim 11 having shaping means comprising a tubular member and a cooperating mandrel therein for engaging said portion of the sheet therebetween and wherein the member and mandrel are chambered to receive steam whereby to heat the opposed walls thereof.

18. The apparatus defined in claim 11 plus means at a further succeeding portion of the path for cooling the heated edge portion of the sheet whereby further to set the same.

19. Apparatus for shaping strip rubber material comprising edge molding instrumentalities, feeding means for advancing a strip to present its edge to said instrumentalities, and means for retarding the movement of the strip acting thereon out of line with said edge molding instrumentalities.

JOHN M. BIERER.
GEORGE E. APEL.